United States Patent Office 2,918,454
Patented Dec. 22, 1959

2,918,454
CONDENSATION POLYMERS

Bruce Graham, Los Altos, Calif., assignor to Ethyl Corporation, New York, N.Y., a corporation of Delaware No Drawing. Application August 16, 1954
Serial No. 450,262

4 Claims. (Cl. 260—78)

This invention relates generally to the production of a high polymeric condensation product and more particularly to an improved copolyamide containing terephthalic acid.

Condensation products produced by the reaction of dibasic carboxylic acids and aromatic diamines are well known and such products are manufactured commercially. As far as is known, the only condensation polymers produced are formed from aliphatic dicarboxylic acids, such as adipic and sebacic acids. Attempts have been made to produce homopolymers of the relatively inexpensive aromatic acids, such as terephthalic acid, instead of the aliphatic dibasic acids but the resulting products have unduly high melting points (generally from about 350–400° C. in the case of terephthalic acid) and have inferior strength properties.

It is accordingly an object of this invention to provide an improved condensation polymer. Another object is to provide a condensation polymer containing terephthalic acid which has a lower melting point than the homopolymer thereof and which has improved strength and other physical properties. Other objects and advantages of the present invention will be apparent from the following description and appended claims.

I have now found that if an acid mixture of terephthalic acid and an alkyl arylene dicarboxylic acid is condensed with an aliphatic diamine, the polymeric product so obtained is exceptionally strong, unusually clear, and is highly stable against heat and light. The polymer also is exceptionally resistant to water. The improved properties of this new polymeric composition are particularly surprising in view of the limited value of the simple condensation polymers produced when either acid alone is condensed with a diamine. Both homopolymers are unduly weak and have poor thermal properties. The polyamides containing only p-phenylene diacetic acid and an aliphatic diamine, for example, are relatively unstable at high temperatures and are degraded by light, moisture and other similar influences. In contrast, as pointed out above, when a mixture of aromatic dibasic acids is employed, in accordance with the present invention, all of these properties are materially improved.

The preferred alkyl arylene dicarboxylic acids have the general formula

wherein $x$ is in integer of 1 to 3 inclusive and $y$ is an integer of 0 to 3 inclusive. Typical examples of these preferred phenylene dicarboxylic acids are homoterephthalic acid, p-phenylene diacetic acid, β-(4-carboxyphenyl)-propionic acid, γ-(4-carboxyphenyl)-butyric acid, p-phenylene dipropionic acid, p-phenylene dibutyric acid, β-(4-carboxymethylphenyl)-propionic acid, and similar derivatives.

Other examples of suitable alkyl aryl dicarboxylic acids are methyl and ethyl γ-substituted homoterephthalic acid and p-phenylene diacetic acid, 1,4-naphthalene diacetic acid, 1,5-naphthalene diacetic acid, 1,4-naphthalene dipropionic acid, 1,4-naphthalene dibutyric acid, and ortho and meta phenylene diacetic acids.

The diamines useful in condensing with terephthalic acid and the alkyl arylene dibasic acids have the general formula of $$NH_2(CH_2)_xNH_2$$

wherein $x$ is at least 4. Typical examples of these diamines are pentamethylene diamine, hexamethylene diamine, octamethylene diamine and decamethylene diamine. Although lower aliphatic diamines can be employed, in general the properties of the polyamides obtained therefrom are inferior to the preferred group given above.

The dibasic acid mixture employed in the condensation with the diamine can vary over relatively wide ranges, although the concentration of the alkyl arylene dibasic acid is somewhat dependent upon the particular dibasic acid employed. Generally the alkyl aryl dibasic acid should be employed in a concentration of between 45–95 percent by weight based upon the total weight of the dibasic acids. When the dibasic acid has a single alkyl substituent, that is, when $y$ is equal to 0, it is preferred to employ between 60–90 percent of this dibasic acid. However, when the dibasic acid has two alkyl substituents, that is when $y$ is equal to 1 or more, it is preferred to employ between 50–70 percent of the alkyl aryl dibasic acid.

For most purposes, stoichiometric quantities of the diamine are employed with the mixed dibasic acid, although some variation is permissible while still obtaining a highly satisfactory polymeric product. In general, neither the dibasic acid mixture or the diamine should be used in greater than 0.02 to 0.10 percent excess over theoretical quantities.

The present process for condensing an aliphatic diamine with terephthalic acid and the alkyl arylene dibasic acids of this invention is carried out by placing the monomers or preferably the salts of the acids and amine in a reactor, preferably having a stainless steel or glass lining. Frequently, it is desired to employ a solvent in the reactor, such as distilled water. The charge is then heated to a temperature between about 200–300° C., preferably between 225–300° C. Since the polymeric condensation product frequently tends to discolor in the presence of air, it is generally desirable to exclude air or to limit the access of air during preparation. This can be done by operating in a closed vessel at least during the early stages of the reaction and in the presence of an inert gas, such as nitrogen or, if an open vessel is used, by providing a stream of inert gas over the reactants. Sometimes it is helpful to add antioxidants to the reaction mixture, such as syringic acid, to prevent disoloration.

When a pressure autoclave, having inert atmosphere, is employed for the reaction, the initial pressure employed is generally between about 50–100 p.s.i. Following heating of the autoclave the internal pressure normally ranges from about 200–400 p.s.i., preferably between about 225–300 p.s.i. This pressure is employed to contain the water of reaction within the autoclave which acts as a solvent for the reactants. Thereafter, the pressure is slowly lowered to atmospheric pressure over a period ranging from about 1 to 8 hours while the temperature of the reaction mass is raised somewhat, generally by about 10–50° C. Thereafter the charge is maintained at this higher temperature for up to about 1 to 5 hours while subjecting the same to a vacuum, frequently less than one millimeter of mercury to distill off the low polymers and unreacted constituents. The latter heating period is not always necessary but is employed as a safety precaution to assure complete condensation by complete removal of water monomers and low polymers.

In general, no catalysts are required in the above disclosed process, but their use sometimes provides additional advantage. Typical examples of suitable catalysts are organic materials of an alkaline reaction, such as oxides and carbonates, and also acidic compounds, such as halogen salts of polyvalent metals, as stannous chloride.

The preferred reactor is constructed of stainless steel or glass, as noted above, but other non-corrosive materials of construction can be used. Included in these materials are enamel, porcelain and relatively inert metals such as silver, gold, platinum, tantalum, rhodium, palladium and various alloys of these and other metals.

The following examples illustrate the present invention but should not be construed as limiting the same. All parts given in these examples are parts by weight.

*Example I*

The salts hexamethylene diammonium terephthalate and hexamethylene diammonium p-phenylene diacetate were prepared by reacting terephthalic acid and p-phenylene diacetic acid separately with hexamethylene diamine using about a 10 percent excess of the diamine. These salts were formed at room temperature in alcohol solution and were recrystallized from aqueous methanol solution.

The hexamethylene diammonium terephthalate (6.17 parts) and hexamethylene diammonium p-phenylene diacetate (6.78 parts) were placed in a glass lined stainless steel autoclave along with 7 parts of distilled water. This charge was then heated under a nitrogen atmosphere having an initial pressure of 80 p.s.i. until the temperature of the reaction mass reached 250° C. At this point the internal pressure of the system was 275 p.s.i. The pressure was thereafter lowered to that of the atmosphere over a period of three hours, while the temperature was raised to 270° C. The charge was then maintained at this temperature for 30 minutes while subjecting the same to a vacuum of less than one millimeter of mercury pressure.

The product (6 parts) had a softening point of 148° C., compared with the homopolymer of hexamethylene terephthalamide of about 360° C., and a sticking temperature of between 264–268° C. The polymer had exceptional strength characteristics, had a very desirable modulus of elasticity, was hard, clear and had good moisture resistance. The polymer also was stable against heat and light. The polymer could be readily molded, formed into fibers and used as a coating on various other materials.

*Example II*

Example I was repeated except that the hexamethylene diammonium terephthalate salt was condensed in the absence of the hexamethylene diammonium p-phenylene diacetate. The product of this reaction was a powder which could not be melted, but instead decomposed at a temperature of above 300° C.

*Example III*

The salts hexamethylene diammonium terephthalate and hexamethylene diammonium homoterephthalate were prepared in accordance with Example I. In this example 12.3 parts of the hexamethylene diammonium terephthalate and 12.8 parts of the hexamethylene diammonium homoterephthalate were placed in the autoclave with 14 parts of distilled water. The condensation was carried out similarly to Example I. The polymeric product obtained had an excellent heat resistance and possessed other physical properties similar to the product obtained in Example I. In particular, the water resistance of the polymer was excellent.

*Example IV*

Example I was repeated except that 16.2 parts by weight of hexamethylene diammonium terephthalate and 11.8 parts by weight of hexamethylene diammonium p-phenylene diacetate were employed. The product had a softening temperature of 299° C. and had a sticking temperature of 308–312° C. The polymer was opaque, was slightly foamed but exceptionally strong.

*Example V*

Example I was repeated except that 10.8 parts by weight of hexamethylene diammonium terephthalate and 17.7 parts by weight of hexamethylene diammonium p-phenylene diacetate were employed. The polymer had a softening temperature of 128° C. and sticking temperature of 236–240° C. The product was transparent, foamed, pliable and very tough.

*Example VI*

Example I was repeated except that 6.75 parts by weight of hexamethylene diammonium terephthalate and 22.2 parts of hexamethylene diammonium p-phenylene diacetate were employed. The product had a softening temperature of 252° C. and a sticking temperature of 285–288° C. The product had a foamed structure, was opaque, pliable and very strong.

*Example VII*

Example I was repeated except that 2.7 parts by weight of hexamethylene diammonium terephthalate and 26.6 parts by weight of hexamethylene diammonium p-phenylene diacetate were employed. The product had a softening temperature of 320° C. and a sticking temperature of 325–328° C. The polymer was somewhat foamed, was opaque and exceptionally tough.

Typical examples of other copolymers that can be produced in accordance with this invention are the condensation product using 5, 20, 40 and 55 percent of terephthalic acid, based on the total weight of the dibasic acid mixture, with either homoterephthalic acid or p-phenylene diacetic and stoichiometric quantities of hexamethylene diamine, octamethylene diamine or decamethylene diamine.

When other alkyl aryl dicarboxylic acids, such as β-(4-carboxyphenyl)-propionic acid or γ-phenylbutyric acid or β-(4-carboxymethylphenyl)-propionic acid are employed in place of the p-phenylene diacetic acid and the homoterephthalic acid, similar results are obtained. The products are exceptionally strong, heat, light, and water resistant and possess a desirable modulus of elasticity.

As is believed apparent from the foregoing, the present invention provides a materially improved polymeric material which can be produced from the potentially inexpensive terephthalic acid which has exceptional light, heat and water insensitivity and which also has unexpectedly improved strength properties over known polymers of terephthalic acid. The products of this invention are very useful for fibers, molded products, coatings and other similar uses.

I claim:

1. The process of forming a thermal condensation product characterized by preparing an aqueous mixture of an alkylene diamine salt of terephthalic acid and an alkylene diamine salt of an arylene dicarboxylic acid having at least one methylene group connecting one of the carboxylic acid groups and not more than three methylene groups connecting each carboxylic acid group to the arylene nucleus, said methylene groups being the sole members separating said carboxylic acid groups from said arylene nucleus, the alkylene diamines having the general formula $$NH_2(CH_2)_xNH_2$$

wherein X is at least 4, and the acid portion of the mixture contains between about 55–5 percent by weight of terephthalic acid, heating the mixture to a temperature of between about 200–300° C. in an inert atmosphere under pressure, thereafter gradually lowering the pressure of the reaction mass and recovering the cocondensation product so formed.

2. A moldable thermal condensation product of a mixture of an alkylene diamine salt of terephthalic acid and an alkylene diamine salt of an arylene dicarboxylic acid having at least one methylene group connecting one of the carboxylic acid groups and not more than three methylene groups connecting each carboxylic acid group to the arylene nucleus, said methylene groups being the sole members separating said carboxylic acid groups from said arylene nucleus, said alkylene diamines having the general formula $$NH_2(CH_2)_x NH_2$$

wherein X is at least 4, said terephthalic acid being employed in a quantity of from about 55 to 5% by weight of the total weight of said acids, and recovering the cocondensation product so formed.

3. The product of claim 2 wherein the arylene dicarboxylic acid has the general formula:

wherein $x$ is an integer of 1–3, inclusive and $y$ is an integer of 0–3, inclusive.

4. The product of claim 3, further characterized by being transparent, the concentration of the arylene dicarboxylic acid being from 60–90% by weight of the total quantity of acid when $y$ is equal to 0, and is 50–70% by weight when $y$ is equal to 1–3, inclusive.

References Cited in the file of this patent
UNITED STATES PATENTS

| 2,615,862 | McFarland et al. | Oct. 28, 1952 |

FOREIGN PATENTS

| 873,983 | France | Apr. 13, 1942 |
| 614,625 | Great Britain | Dec. 20, 1948 |
| 865,774 | Germany | Feb. 5, 1953 |
| 878,859 | Germany | June 8, 1953 |

OTHER REFERENCES

Hill et al.: J. Polymer Science, vol. 3, No. 5, 1948, pages 609, 619, 620 and 621. Copy in Div. 50.

Chemical and Engineering News, vol. 30, No. 43, October 27, 1952, page 4513. Copy in Scientific Library.